(12) United States Patent
Guyton

(10) Patent No.: US 9,993,061 B2
(45) Date of Patent: Jun. 12, 2018

(54) BACKPACK FOR SMART SELF-BALANCING ELECTRIC SCOOTER

(71) Applicant: Ronald Guyton, Las Vegas, NV (US)

(72) Inventor: Ronald Guyton, Las Vegas, NV (US)

( * ) Notice: Subject to any disclaimer, the term of this patent is extended or adjusted under 35 U.S.C. 154(b) by 0 days. days.

(21) Appl. No.: 15/406,310

(22) Filed: Jan. 13, 2017

(65) Prior Publication Data

US 2017/0196346 A1 Jul. 13, 2017

Related U.S. Application Data

(60) Provisional application No. 62/278,092, filed on Jan. 13, 2016.

(51) Int. Cl.
| | | |
|---|---|---|
| *A45F 3/00* | (2006.01) |
| *A45F 3/04* | (2006.01) |
| *B62B 5/06* | (2006.01) |
| *B62B 5/00* | (2006.01) |
| *A45C 5/14* | (2006.01) |
| *A45C 13/10* | (2006.01) |
| *A45C 13/26* | (2006.01) |
| *A45C 11/00* | (2006.01) |

(52) U.S. Cl.
CPC .............. *A45F 3/047* (2013.01); *A45C 5/14* (2013.01); *A45C 11/00* (2013.01); *A45C 13/103* (2013.01); *A45C 13/1076* (2013.01); *A45C 13/262* (2013.01); *B62B 5/0023* (2013.01); *B62B 5/067* (2013.01); *A45C 2013/1015* (2013.01); *B62B 2202/61* (2013.01); *B62B 2202/90* (2013.01)

(58) Field of Classification Search
CPC . A45F 3/047; A45C 5/14; A45C 11/00; A45C 13/103; A45C 13/1076; A45C 13/262; A45C 2013/1015; B62B 5/0023; B62B 5/67; B62B 2202/61; B62B 2202/90
USPC ......................................................... 224/576
See application file for complete search history.

(56) References Cited

U.S. PATENT DOCUMENTS

| | | | | |
|---|---|---|---|---|
| 4,368,835 A | * | 1/1983 | Murphy ................... | A45F 3/08 224/153 |
| 5,491,872 A | * | 2/1996 | Tserng ................. | A45C 13/262 16/113.1 |
| 5,564,538 A | * | 10/1996 | Sadow ..................... | A45C 5/14 190/115 |
| 5,676,286 A | | 10/1997 | Song | |

(Continued)

*Primary Examiner* — Peter Helvey
(74) *Attorney, Agent, or Firm* — Global Intellectual Property Agency, LLC; Jordan Sworen

(57) ABSTRACT

A backpack for stowing and carrying a smart self-balancing electric scooter is provided. The backpack includes a tubular shaped body defining an interior compartment sized to fit a self-balancing electric scooter compactly therein. A pocket disposed in the interior compartment receives the scooter's battery and a slot disposed in the body provides a power cord access to the interior compartment, such that the scooter may be charged while stowed in the backpack. A flame retardant layer lining the interior compartment extinguishes any fire caused by the scooter battery, while the scooter charges in the backpack. An access flap and an access collar provide access to the interior compartment for stowing the scooter. A shoulder harness enables the backpack to be carried and a retractable handle and a plurality of multidirectional wheels enable the backpack to be towed while the scooter is stowed therein.

19 Claims, 4 Drawing Sheets

(56) References Cited

U.S. PATENT DOCUMENTS

| | | | | |
|---|---|---|---|---|
| 5,749,503 A * | 5/1998 | Wulf | ............. | A45C 5/14 |
| | | | | 190/18 A |
| 5,797,617 A * | 8/1998 | Lin | ............. | B62B 1/125 |
| | | | | 190/18 A |
| 5,984,154 A * | 11/1999 | Scicluna | ............. | A45F 3/04 |
| | | | | 190/18 A |
| 6,129,365 A * | 10/2000 | Sadow | ............. | A45C 13/262 |
| | | | | 16/114.1 |
| 6,179,176 B1 * | 1/2001 | Saggese | ............. | A45C 5/146 |
| | | | | 190/18 A |
| 6,193,033 B1 * | 2/2001 | Sadow | ............. | A45C 5/14 |
| | | | | 16/405 |
| 6,279,706 B1 * | 8/2001 | Mao | ............. | A45C 5/14 |
| | | | | 16/113.1 |
| 6,592,012 B2 | 7/2003 | Godshaw et al. | | |
| 6,672,600 B2 | 1/2004 | Engelhardt et al. | | |
| 7,322,452 B2 | 1/2008 | Nykoluk | | |
| 7,617,956 B1 | 11/2009 | Sabbah | | |
| 8,152,178 B2 * | 4/2012 | Sun | ............. | A45C 3/04 |
| | | | | 280/35 |
| 8,733,766 B2 * | 5/2014 | Nieman | ............. | A45C 13/385 |
| | | | | 280/30 |
| 9,834,037 B2 * | 12/2017 | Carter | ............. | B60B 35/025 |

\* cited by examiner

BACKPACK FOR SMART SELF-BALANCING ELECTRIC SCOOTER

CROSS REFERENCE TO RELATED APPLICATIONS

This application claims the benefit of U.S. Provisional Application No. 62/278,092 filed on Jan. 13, 2016. The above identified patent application is herein incorporated by reference in its entirety to provide continuity of disclosure.

BACKGROUND OF THE INVENTION

The present invention relates to backpacks. More specifically, the present invention relates to a towable, wheeled backpack having the contour of a smart self-balancing electric scooter, a battery storage pocket, and a flame retardant interior. Smart self-balancing electric scooters have increased substantially in popularity as of late. This is due in part to the fact that they are highly trendy and enjoyable to use for recreational purposes. Moreover, they are relatively easy to use and easy to maneuver, and are easily transportable in vehicles as they are of relatively light weight. Additionally, they are a convenient means of transportation. Students and commuters of all ages utilize smart self-balancing electric scooters for transportation.

The advent of the smart self-balancing electric scooters has created a need for backpacks for carrying, stowing, and transporting them when not in use. However, backpacks heretofore utilized do not include a backpack contoured like a smart self-balancing electric scooter, wherein the backpack is sized specifically to fit the scooter, nor do they include battery pockets for receiving the battery provided with the scooters, flame retardant interior layers for extinguishing a fire, multidirectional wheels, or retractable handles for towing the backpack. In these respects, the backpack according to the present invention substantially departs from the conventional concepts and designs of the prior art, and in so doing provides an apparatus primarily developed for the purpose of providing a backpack for use when stowing, carrying, and transporting a smart self-balancing electric scooter.

SUMMARY OF THE INVENTION

In view of the foregoing disadvantages inherent in the known types of backpacks now present in the prior art, the present invention provides a wheeled backpack wherein the same can be utilized for providing convenience for the user when storing, carrying, and transporting a smart self-balancing electric scooter. The present invention comprises a tubular body including a back portion opposite a front portion and an upper portion opposite a lower portion. The tubular body defines an interior compartment including an interior volume having the contour of a smart-self balancing electric scooter. The interior compartment includes a flame retardant layer and a pocket for storing a battery. The upper portion includes an opening for providing access to the interior compartment. A shoulder harness disposed on the back portion extends longitudinally from an upper end of the back portion to a lower end of the back portion. A recessed portion disposed on the front portion extends longitudinally from an upper end of the font portion to a lower end of the front portion. The recessed portion further extends radially inwardly towards the interior compartment, forming an inward concavity relative to a longitudinal axis of the tubular body. A flap disposed on the front portion extends longitudinally from the upper end of the front portion to the lower end of the front portion. The flap is removably attachable to the front portion via a zippered line of connection. A collar disposed on the upper portion extends annularly about a perimeter edge of the upper portion and includes a fastener for removably attaching the collar to the body and providing access to the opening of the upper portion. A retractable handle slidably disposed on the upper portion includes a plurality of elongated members slidably disposed within one another forming a telescopic arrangement. A plurality of wheels are rotatably coupled to an exterior of the lower portion.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
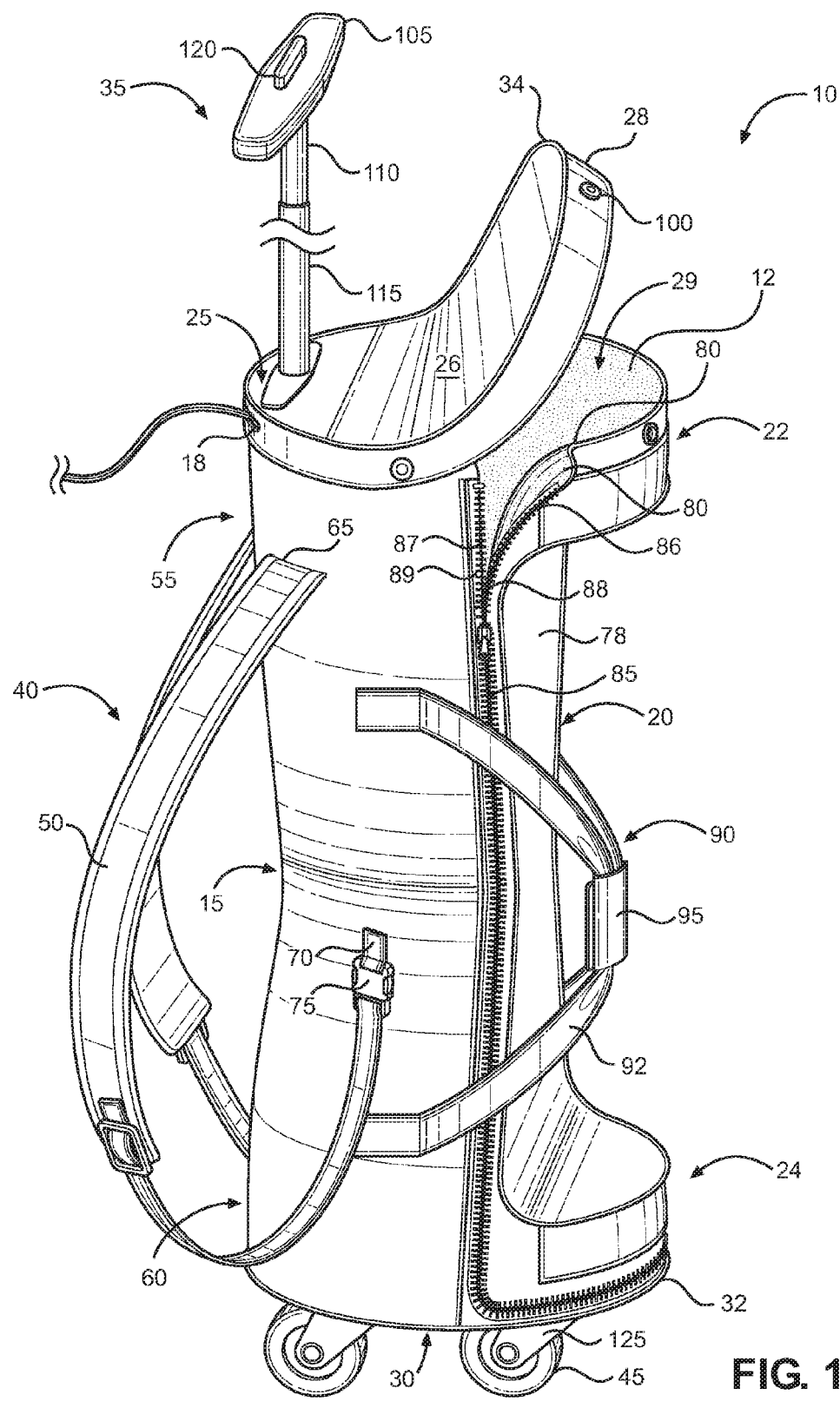
FIG. 1 shows a perspective view of the backpack.

Reference is made herein to the attached drawings. Like reference numerals are used throughout the drawings to depict like or similar elements of the wheeled backpack. The figures are intended for representative purposes only and should not be considered to be limiting in any respect.

Referring now to FIG. 1, there is shown a perspective view of the backpack. The backpack 10 provides a flexible backpack including a tubular shaped body having a back portion 15 opposite a front portion 20, and an upper portion 25 opposite a lower portion 30, defining a flame retardant interior compartment 12 having the contour of a smart self-balancing electric scooter for fitting a scooter of this kind, compactly, therein. The interior compartment 12 includes a pocket for storing the scooter's battery inside of the backpack 10 and a slot 18 for providing access into the interior compartment 12. The slot 18 is configured to receive a power cord therethrough, such that a user can charge the scooter while stowed in the backpack 10. In this way, besides providing a means for stowing and transporting a smart self-balancing electric scooter, the backpack 10 provides a fireproof backpack, capable of charging the scooter therein and preventing or extinguishing any fire caused by the scooter battery while the scooter charges in the backpack 10.

The back portion 15 includes a shoulder harness 40, the front portion 20 includes a recessed portion 78 and an access flap 80, the upper portion 25 includes an access collar 28 and a retractable handle 35, and the lower portion 30 includes a plurality of multidirectional wheels 45. In one embodiment, the upper portion 25 and the lower portion 30 include the same diameter so as to provide a uniform diameter at the upper and lower portions 25, 30 of the backpack 10 so as to fit the wheels of a smart self-balancing electric scooter securely in each of the upper and lower portions 25, 30.

The shoulder harness 40 extends longitudinally from an upper end 55 of the back portion 15 to a lower end 60 of the back portion 15. In the depicted embodiment, the shoulder harness 40 includes a pair of shoulder straps 50 for mounting the backpack 10 longitudinally on a user's shoulders and back. The shoulder straps 50 include a first end 65 affixed to the upper end 55 of the back portion 15 and a second end 70 removably affixed to the backpack 10 via an adjustable buckle 75. The adjustable buckle 75 enables the shoulder straps 50 to be adjusted for differently sized users. In the depicted embodiment, the adjustable buckle 75 comprises a side release buckle and the slot 18 is disposed on the upper end 55 of the back portion 15.

The recessed portion 78 extends longitudinally from an upper end 22 of the front portion 20 to a lower end 24 of the front portion 20 and is recessed radially inwardly towards the interior compartment 12, such that the recessed portion 78 forms a concavity towards the interior compartment 12 of the backpack 10 and includes a diameter less than a diameter of the upper end 22 and the lower end 24.

The access flap 80 extends from the upper end 22 towards the lower end 24 and provides access to the interior compartment 12 of the backpack 10. The access flap 80 is removably securable to the front portion 20 via a zippered line of connection 85 that includes a first line of mating teeth 86 and a second line of mating teeth 87, which lines of mating teeth 86, 87 correspond for fastening the lines of mating teeth 86, 87 to one another and securing the zippered line of connection 85. The first line of mating teeth 86 extends along an edge 88 of the flap 80. The second line of mating teeth 87 extends along a longitudinal edge 89 of the front portion 20 and partially along a perimeter edge 32 of the lower portion 30. The longitudinal edge 89 extends vertically linearly along the longitudinal axis of the backpack 10, and in one embodiment extends from the upper end 22 of the front portion 20 to the lower end 24 of the front portion 20. The zippered line of connection 85 may be fastened to secure the access flap 80 to the front portion 20 of the backpack 10 and may be opened to enable the access flap 80 to detach from the front portion 20 and extend radially outwardly in order to provide access to the interior compartment 12 of the backpack 10.

The front portion 20 further includes a handle 90 for providing a means for carry the backpack 10 when not utilizing the shoulder harness 40. In the depicted embodiment, the handle 90 includes a pair of straps 92 affixed to opposing sides of the backpack 10 that extend radially outwardly. The pair of straps 92 include a fastener 95 for fastening the straps to one another so as to provide a more comfortable means of utilizing the handle 90. In the depicted embodiment, the fastener 95 includes a band having a hook and loop fastener, such as Velcro, that wraps around the pair of straps 92 to secure them to one another.

The access collar 28 provides access to an opening 29 in the backpack 10 and is removably attachable to the upper end 22 of the front portion 20. The collar 28 extends annularly around a perimeter edge 34 of the upper portion 25 and perpendicularly relative to an upper surface 26 of the upper portion 25. The access collar 28 includes a fastener 100 for attaching the access collar 28 to the upper end 22 of the front portion 20 and the upper end 55 of the back portion 15. In this way, the access flap 80 and the access collar 28 provide access to the opening 29, which in turn provides access to the interior compartment 12. In the depicted embodiment, the fastener 100 includes a plurality of complimentary mating snap buttons disposed on an interior of the access collar 28 and an exterior of the upper end 22.

The retractable handle 35 includes an ergonomically shaped grip 105 for providing a comfortable grasping surface, and an elongated member having a plurality of sections slidably disposed within one another, thereby forming a telescopic arrangement. In the depicted embodiment, the handle 35 is disposed adjacent to the perimeter edge 34 of the upper portion 25 and includes a first elongated member 110 slidably disposed in an interior of a second elongated member 115, which in turn is slidably disposed within an interior of the backpack 10. The handle 35 is operable via an actuator 120, which when actuated enables the second elongated member 115 to extend from the interior of the backpack 10 and the first elongated member 110 to extend from the second elongated member 115. In the depicted embodiment, the actuator 120 comprises a button disposed on an upper surface of the grip 105, which when depressed enables extension of the handle 35.

Figure 4:
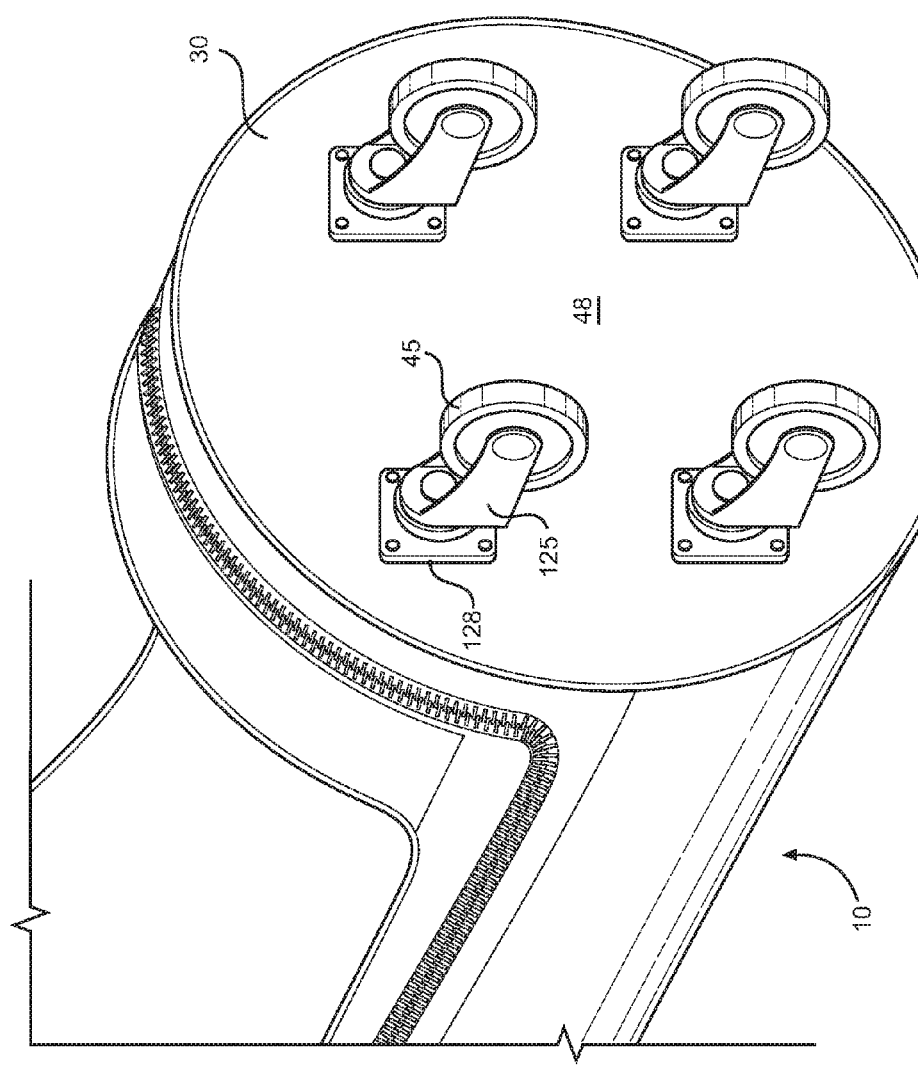
FIG. 4 shows a perspective bottom view of the plurality of wheels of the backpack.

The plurality of wheels 45 are disposed on an exterior surface 48 of the lower portion 30 of the backpack 10. Each of the plurality of wheels 45 is rotatably coupled to a housing 125, which in turn is rotatably coupled to the lower portion 30 via a swivel plate 128, as shown by FIG. 4. The housing 125 is independently coupled to the lower portion 30, thereby enabling the housing 125 to rotate independently of the plurality of wheels 45 in any direction in which the backpack 10 is moved, while the plurality of wheels 45 rotate independently within the housing 125 as they move along a surface. In this way, a user can change the directionality of the plurality of wheels 45, e.g., forwards, backwards, sideways, at the same time they are rotating on a surface, enabling a user to push or pull the backpack 10 in any direction, without interference. The plurality of wheels 45 work in conjunction with the retractable handle 35 to provide a means by which a user can pull or push the backpack 10 along a surface in the event the user does not wish to carry the backpack 10. In the depicted embodiment, the backpack 10 includes four wheels evenly disposed on the exterior surface 48 of the lower portion 30, such that the wheels balance the backpack 10 in an upright position when placed on a surface.

Figure 2:
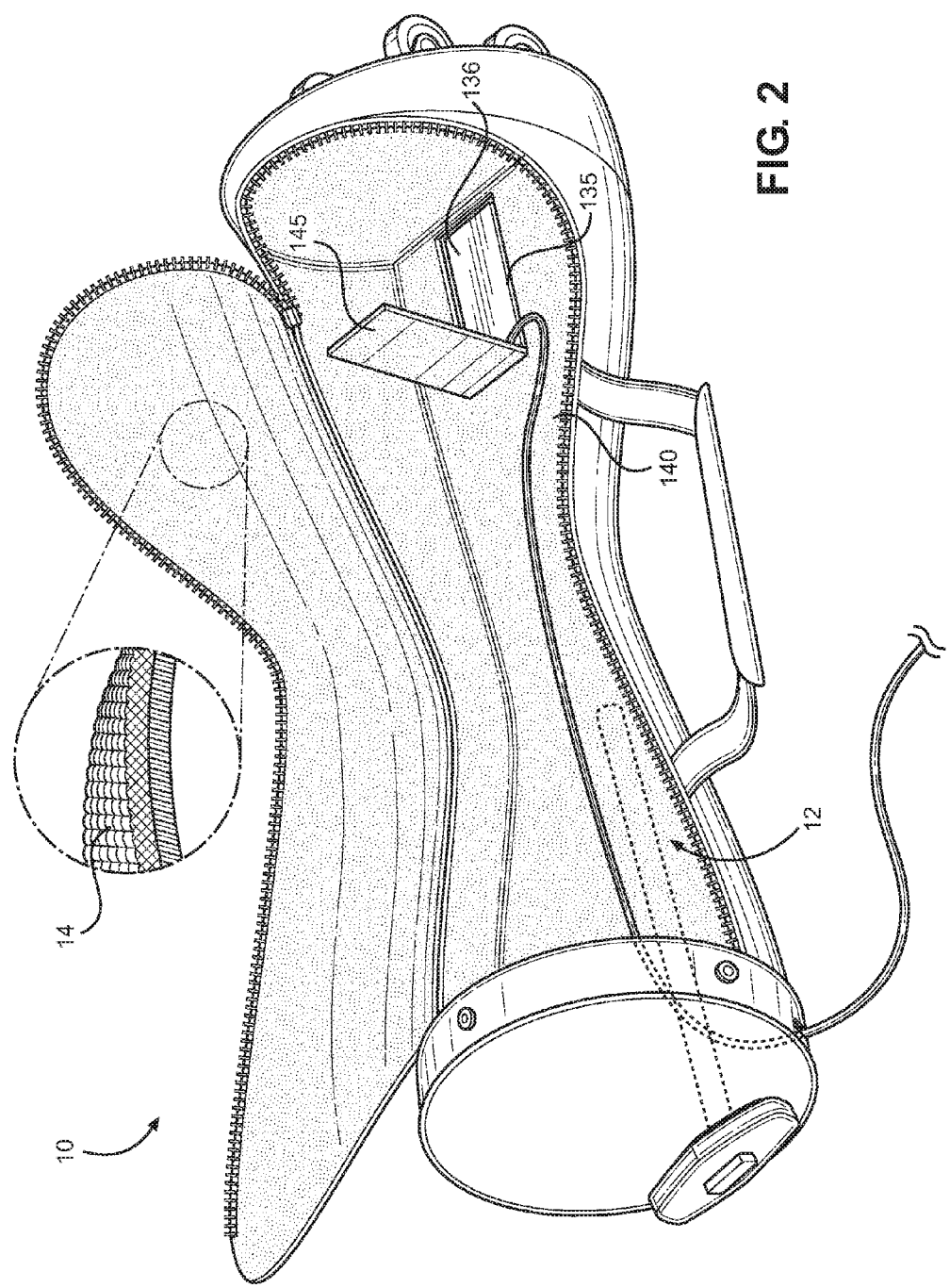
FIG. 2 shows a perspective view of the interior compartment of the backpack.

Referring now to FIG. 2, there is shown a perspective view of the interior compartment of the backpack. The interior compartment 12 defines and interior volume including a layer 14 composed of flame retardant material, such as silica fabric, and a pocket 135 for storing the battery 136 of a smart self-balancing electric scooter therein. The pocket 135 includes a recessed area disposed in a base 140 of the interior compartment 12 that includes an interior flap 145 for providing access into the pocket 135. In this way, the pocket 135 provides a way in which to conceal a battery 136 in the interior compartment 12. In the depicted embodiment, the interior flap 145 is hingedly connected to the base 140 via a living hinge. The pocket 135 enables a user to store a battery 136 therein while using the backpack 10 such he or she can charge his or her scooter on the go.

Figure 3:
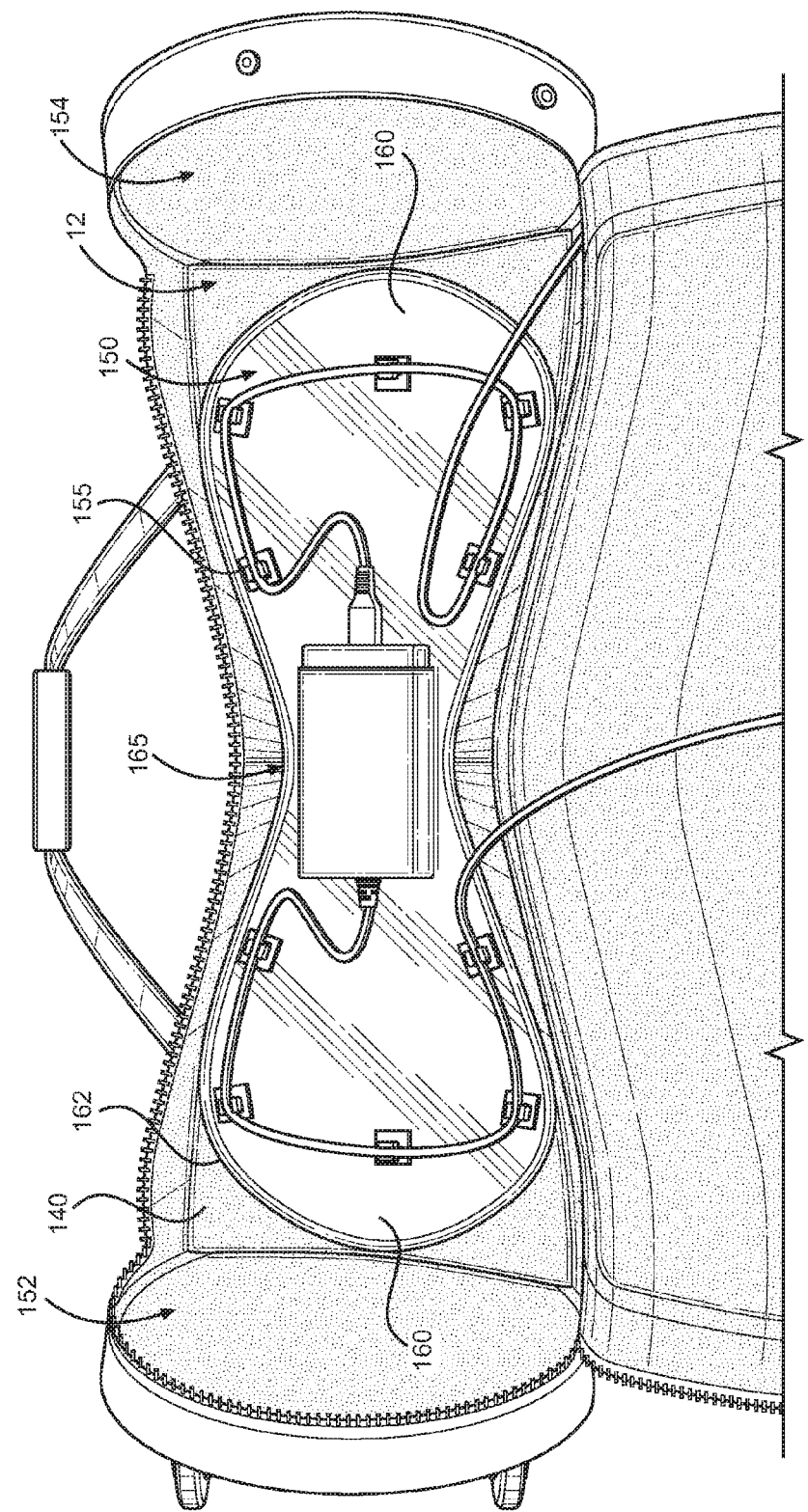
FIG. 3 shows a perspective view of an alternative embodiment of the interior compartment of the backpack.

Referring now to FIG. 3, there is shown an alternative embodiment of the interior compartment of the backpack. In one embodiment, the base 140 of the interior compartment 12 includes a rigid plate 150 extending from a first end 152 of the interior compartment 12 to a second end 154 of the interior compartment 12. The rigid plate 150 includes opposing arcuate ends 160 having a common perimeter edge 162 that tapers towards a center 165, such that the opposing arcuate ends 160 decrease in diameter towards the center 165, forming a barbell or hourglass shape, similar the contour of a smart self-balancing electric scooter. The rigid plate 150 includes a plurality of clips 155 configured to receive a cord 158 therein for fastening a scooter battery onto the rigid plate 150. In the depicted embodiment, the plurality of clips 155 are disposed evenly about the perimeter edge 162. The rigid plate 150 provides support for sustaining a smart self-balancing electric scooter when stowed in the backpack 10.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A backpack, comprising:
   a tubular body including a back portion opposite a front portion and an upper portion opposite a lower portion, defining an interior compartment including an interior volume having the contour of a smart-self balancing electric scooter;
   the interior compartment including a flame retardant layer and a pocket for storing a battery;
   the upper portion including an opening for providing access to the interior compartment;
   a shoulder harness disposed on the back portion, the shoulder harness extending longitudinally from an upper end of the back portion to a lower end of the back portion;
   a recessed portion disposed on the front portion, the recessed portion extending longitudinally from an upper end of the font portion to a lower end of the front portion;
   the recessed portion extending radially inwardly towards the interior compartment, forming an inward concavity relative to a longitudinal axis of the tubular body;
   a flap disposed on the front portion, the flap extending longitudinally from the upper end of the front portion to the lower end of the front portion;
   the flap removably attachable to the front portion via a zippered line of connection;
   a collar disposed on the upper portion, the collar extending annularly about a perimeter edge of the upper portion and including a fastener for removably attaching the collar to the body and providing access to the opening of the upper portion;
   a retractable handle slidably disposed in the upper portion, the retractable handle including a plurality of elongated members slidably disposed within one another forming a telescopic arrangement; and
   a plurality of wheels rotatably disposed in a housing, each housing rotatably coupled to an exterior of the lower portion.

2. The backpack of claim 1, further including a handle disposed on the front portion of the tubular body.

3. The backpack of claim 2, wherein the handle comprises a pair of straps attached to opposing sides of the back portion and extending radially outwardly towards the front portion.

4. The backpack of claim 3, wherein the handle includes a band having a hook and loop fastener configured to wrap around the pair of straps and secure the pair of straps to one another.

5. The backpack of claim 1, wherein the shoulder harness comprises a pair of aligned shoulder straps, each of the pair of aligned shoulder straps including a first end and a second end, wherein the first end is affixed to the upper end of the back portion and the second end is affixed to the lower end of the back portion via an adjustable buckle for adjusting the shoulder straps.

6. The backpack of claim 5, wherein the adjustable buckle includes a side release buckle for removably attaching the second ends of the shoulder straps to the back portion.

7. The backpack of claim 1, wherein the recessed portion includes a diameter less than a diameter of the upper portion and the lower portion.

8. The backpack of claim 1, wherein the zippered line of connection includes a first line of mating teeth and a second line of mating teeth that correspond in order to secure the zippered line of connection, the first line of mating teeth extending along a longitudinal edge of the back portion and a perimeter edge of the lower portion and the second line of mating teeth extending along an edge of the flap.

9. The backpack of claim 8, wherein the longitudinal edge extends vertically linearly from the upper end of the front portion to the lower end of the front portion along a longitudinal axis of the backpack.

10. The backpack of claim 1, wherein the fastener of the collar includes a plurality of complimentary snap buttons disposed evenly about the collar.

11. The backpack of claim 1, wherein the retractable handle includes a first elongated member slidably disposed in a second elongated member, the second elongated member slidably disposed in an interior of the body.

12. The backpack of claim 11, wherein the retractable handle includes a grip disposed on an end of the first elongated member, the grip including an actuator for slidably extending and retracting the handle from the body.

13. The backpack of claim 12, wherein the grip comprises an ergonomic grip.

14. The backpack of claim 12, wherein the actuator includes a push button actuator.

15. The backpack of claim 1, further comprising a slot disposed on the upper end of the back portion, the slot sized to receive a power cord therethrough.

16. The backpack of claim 1, wherein the flame retardant layer is composed of silica fabric.

17. The backpack of claim 1, wherein the pocket includes a recessed area disposed in a base of the interior compartment and a flap for covering and providing access to the recessed area, the recessed area being positioned on an end of the interior compartment.

18. A backpack, comprising:
   a tubular body including a back portion opposite a front portion and an upper portion opposite a lower portion, defining an interior compartment including an interior volume having the contour of a smart-self balancing electric scooter;
   the interior compartment including a flame retardant layer and a rigid plate having a plurality of clips, each configured to receive a portion of a power cord therein;
   the upper portion including an opening for providing access to the interior compartment;

a shoulder harness disposed on the back portion, the shoulder harness extending longitudinally from an upper end of the back portion to a lower end of the back portion;

a recessed portion disposed on the front portion, the recessed portion extending longitudinally from an upper end of the font portion to a lower end of the front portion;

the recessed portion extending radially inwardly towards the interior compartment, forming an inward concavity relative to a longitudinal axis of the tubular body;

a flap disposed on the front portion, the flap extending longitudinally from the upper end of the front portion to the lower end of the front portion;

the flap removably attachable to the front portion via a zippered line of connection;

a collar disposed on the upper portion, the collar extending annularly about a perimeter edge of the upper portion and including a fastener for removably attaching the collar to the body and providing access to the opening of the upper portion;

a retractable handle slidably disposed in the upper portion, the retractable handle including a plurality of elongated members slidably disposed within one another forming a telescopic arrangement; and a plurality of wheels rotatably disposed in a housing, each housing rotatably coupled to an exterior of the lower portion.

19. The backpack of claim 18, wherein the rigid plate includes opposing arcuate ends having a common perimeter edge that tapers toward a center, such that the opposing arcuate ends decrease in diameter towards the center.

* * * * *